United States Patent [19]

Robertson-Aikman

[11] 4,185,835
[45] Jan. 29, 1980

[54] GRAMOPHONE PICK-UP ARMS

[76] Inventor: Alastair J. Robertson-Aikman, Stokes, Steyning, Sussex, England

[21] Appl. No.: 912,779

[22] Filed: Jun. 5, 1978

[30] Foreign Application Priority Data

Jun. 9, 1977 [GB] United Kingdom ............. 24233/77

[51] Int. Cl.² .............................................. G11B 3/10
[52] U.S. Cl. ................................................. 274/23 R
[58] Field of Search ........................... 274/23 R, 23 A

[56] References Cited

U.S. PATENT DOCUMENTS

| | | | |
|---|---|---|---|
| 3,645,541 | 2/1972 | Robertson-Aikman | 274/23 R |
| 3,722,893 | 3/1973 | Shimoda | 274/23 R |

FOREIGN PATENT DOCUMENTS

| | | | |
|---|---|---|---|
| 1232359 | 1/1967 | Fed. Rep. of Germany | 274/23 R |
| 1522995 | 10/1969 | Fed. Rep. of Germany | 274/23 R |
| 2406864 | 8/1974 | Fed. Rep. of Germany | 274/23 R |
| 2303337 | 10/1976 | France | 274/23 R |
| 977841 | 12/1964 | United Kingdom | 274/23 R |

Primary Examiner—John W. Shepperd
Attorney, Agent, or Firm—Pollock, Vande Sande & Priddy

[57] ABSTRACT

A gramophone pick-up arm has a balance weight arrangement which comprises a selectable number of lead laminations contained in a molded plastic box constituting a main balance weight casing which is adjustable in two directions, one direction being aligned with the axis of the arm at its pivotal and rotational bearings and the second direction being aligned with the pivotal axis of the arm. Light weight plastic spacers may be included in the box to prevent the lead laminations from moving about therewithin. The main balance weight casing carries a pair of flanking rider weights arranged laterally with respect to the length of the arm, one of the rider weights being provided with a micrometer screw adjustment whereby its position relative to the main balance weight casing can be precisely set for fine control, and the other rider weight providing coarse control and being indexable between forward and rearward limiting positions. Apart from the weights per se, all components of the balance weight arrangement are formed of precision molded glass or carbon fiber loaded plastic, as also is a bearing carrier into which the arm proper plugs, and from which the balance weight arrangement is adjustably carried, and integral with which are knife-edge bearing portions. The arm proper is a titanium tube processed in an atmosphere of nitrogen so as to develop a hard titanium nitride outer layer.

21 Claims, 5 Drawing Figures

GRAMOPHONE PICK-UP ARMS

FIELD OF THE INVENTION

This invention concerns improvements in or relating to pick-up arms for gramophones (record players), and is concerned particularly with precision pick-up arms for high-fidelity sound reproduction.

BACKGROUND OF THE INVENTION AND BRIEF DESCRIPTION OF THE PRIOR ART

As is well known, a pick-up arm basically comprises an elongate arm having a headshell attached to one end thereof for carrying a pick-up cartridge and journalled adjacent its other end in a bearing arrangement providing for rotation of the arm about a vertical axis (for movement of the arm across the surface of a gramophone record) and for pivotal movement about a horizontal axis (for enabling the cartridge carrying end of the arm to be raised and lowered with respect to a record surface and for accommodating warp of the record surface). A balance weight arrangement is supported on the end of the arm remote from the cartridge carrying end and serves to balance the weight of the arm forward of the bearing arrangement and the weight of the cartridge mounted in the headshell, and to enable the tracking force (the force exerted by the stylus upon the record groove) to be set. In pick-up arms designed for high fidelity sound reproduction, all of the component parts of the arm are precision made, since any defects in their manufacture can give rise to undesirable sound distortions.

In the discussion which follows, the pick-up arm according to the present invention will be contrasted with the prior art SME Series II precision pick-up arm which was manufactured by SME Limited of Steyning, Sussex, BN4 3GY, England and has been widely acclaimed as a pick-up arm of exceptionally high quality. The pick-up arm according to the present invention has many constructional details in common with the SME Series II arm, but differs considerably from the latter in regard to its balance weight arrangement.

The balance weight arrangement in the SME Series II arm comprises a main balance weight of cylindrical form which is mounted on the back end of the arm coaxially with the arm and is arranged to translate longitudinally of the arm upon axial rotation of the weight, together with a fine adjustment balance weight which is very much smaller in mass than the main weight and is slidably mounted on one limb of an L-shaped carrier the other limb of which is slidably engaged in a member secured to the back end of the arm. By movement of the fine adjustment balance weight along the first limb, which extends parallel to the arm, the position of the fine adjustment balance weight relative to the arm bearings can be adjusted. By movement of the L-shaped carrier bodily by sliding the other limb thereof into or out of its accommodating bore, the lateral balance of the arm can be adjusted. These and other details of the SME Series II arm will be described in greater detail hereinafter.

BRIEF DESCRIPTION OF THE INVENTION

The pick-up arm according to the present invention seeks to improve upon the performance of the SME Series II arm particularly, though not exclusively, by use of a balance weight arrangement which does not rely upon the displacement of a fixed mass main balance weight relative to the arm bearings for effecting balancing of the arm. Instead, and in order particularly (though not exclusively) to obtain a balanced system with as low inertia as possible, the present invention utilizes the concept of a main balance weight carrier adapted to carry as many or as few balance weight elements as may be required to balance the arm together with whatever cartridge is fitted, with the carrier located closely adjacent to the arm bearings. Thus, in an exemplary embodiment of the invention which will be described in detail hereinafter, the balance weight carrier comprises a box structure which is suspended from the back end of the arm adjacent to the arm bearings, and lead laminations are provided to be inserted into the box in whatever quantity is required to balance the particular cartridge used with the arm. The laminations should be packed into the box so as to provide the heaviest balance weight that will balance the arm with the weight as close as possible to the arm bearings, it being appreciated that the balance weight carrier (that is, the box) is longitudinally adjustable to vary its position relative to the arm bearings for fine control of the arm balancing.

Other features of the present invention, which will become more apparent after consideration of the following detailed description of the exemplary embodiment of the invention which is mentioned above, include the provision of a pair of rider weights flanking the main balance weight and adjustable relative thereto, one of the rider weights providing coarse control of balance adjustment and the other being provided with a micrometer screw adjustment facility enabling fine control. Lateral adjustment of the balance weight arrangement relative to the arm bearings may also be provided for enabling the lateral balance of the arm to be adjusted. The main balance weight carrier and the rider weight housings are advantageously formed of synthetic plastic material by molding in precision dies, the material advantageously being loaded with glass fiber or carbon fiber for optimizing its mechanical properties to suit this application.

Whereas in the SME Series II arm the arm bearings provide for pivotal movement of the arm about an axis which is perpendicular to the line of the arm at the point where the arm intersects the bearings, in the embodiment of the invention which is described hereinafter the bearings are inclined to the arm at its intersection with the bearings, the inclination being such that, having regard to the curved, generally S-shape of the arm proper, the pivotal axis is perpendicular to the center line of the headshell. The balance weight arrangement also follows this geometry, the main balance weight carrier and its flanking rider weights all being in the form of parallelepipeds having one pair of parallel side walls parallel to the horizontal axis for pivotal movement of the arm and the other pair of parallel side walls parallel to the line of the arm proper at its intersection with the bearings. It will be noted from the following discussion that the major dimension of the parallelepipedal main balance weight carrier is parallel to the horizontal pivotal axis of the arm which assists in maintaining the center of gravity of the main balance weight as close as possible to the armbearings.

In the field of high-fidelity sound reproduction, an apparently insignificant design change can provide substantial improvements. It is believed that the fundamental design changes which can be seen in the pick-up arm according to the invention will substantially increase the high-fidelity performance of the arm.

DESCRIPTION OF THE DRAWINGS

In order that the invention may be more clearly understood, an exemplary embodiment thereof will hereinafter be described, and contrasted with a prior art gramophone pick-up arm, with reference to the accompanying drawings wherein.

DESCRIPTION OF PRIOR ART

Figure 1:
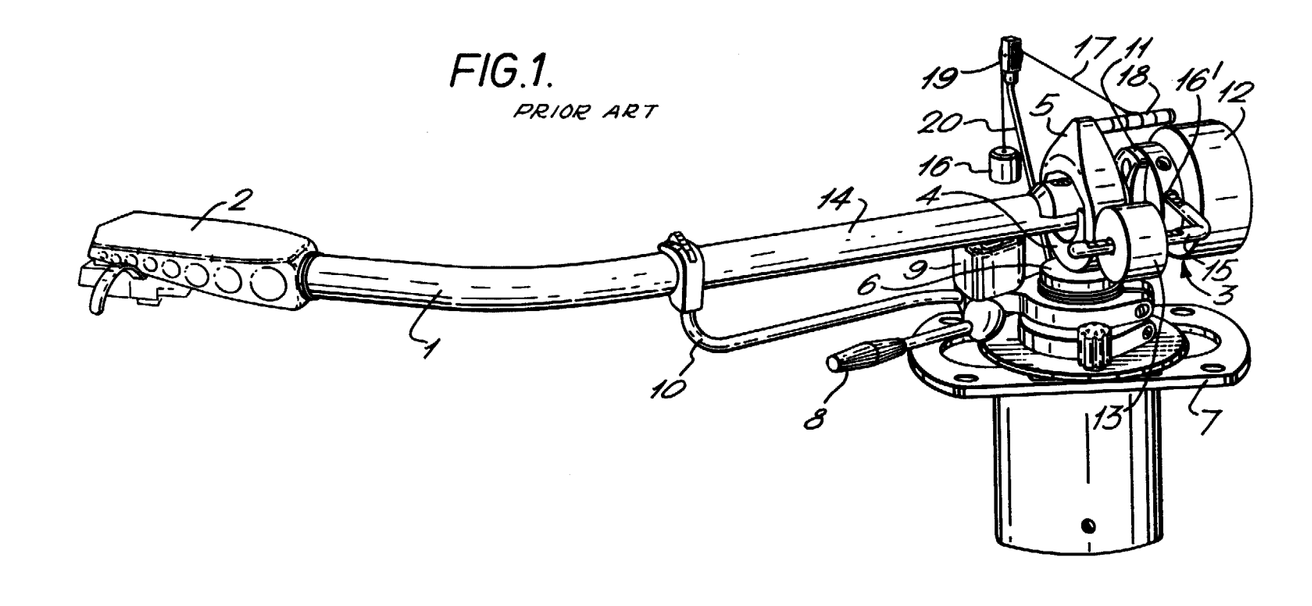
FIG. 1 is a perspective view of the well known prior art SME Series II precision pick-up arm.

Referring first to FIG. 1, the pick-up arm shown therein will be recognized by those with knowledge of high-fidelity sound reproduction as the highly successful and widely acclaimed SME Series II precision pick-up arm. The construction and operation of this pick-up arm is well known and will be described only very briefly here. As shown, the arm proper which is designated 1 in the Figure carries a headshell 2 at one end thereof for receiving an appropriate pick-up cartridge, and at the other end thereof carries a balance weight arrangement which is generally designated 3. The arm 1 is supported adjacent to the balance weight arrangement 3 by means of a knife-edge bearing (not shown) secured to the arm 1 and co-operating with V-grooves formed in a supporting yoke 4. A yoke head piece 5 is secured to the yoke 4 so as to capture the arm bearing.

The yoke 4 is attached to the top end of an axially rotatable pillar 6 which, as is well known, permits movement of the yoke 4 such as to enable pivotal movement of the arm 1 in the plane of the gramaphone turntable with which the pick-up arm is used. The pillar 6 is journalled in known fashion with respect to a base plate 7 provided for securing the pick-up arm to the deck of a gramophone, the orientation of the arm relative to the base plate being adjustable, and supported with respect to the base plate 7 is a manually operable arm raising and lowering arrangement comprising control lever 8 and dash-pot 9. A rest 10 is provided for the arm 1 when it is not in use.

Referring more particularly to the balance weight arrangement 3, this comprises a member 11 affixed to the end of the arm proper 1 and carrying a main balance weight 12 and a fine control balance weight 13. The main balance weight 12 is screw-threadedly mounted with respect to the member 11 so that rotation of the weight 12 causes it to translate towards or away from the knife-edge mounting of the arm in yoke 4 along a line coaxial with the straight portion 14 of the arm proper 1. For counterbalancing the weight of a heavy cartridge mounted in the headshell 2, the weight 12 is moved outwardly away from the yoke 4 an appropriate distance, and, for counterbalancing a relatively light weight cartridge, the weight 12 will be positioned closer to the yoke 4. The fine control balance weight 13 is slidably mounted as shown upon one limb of an L-shaped support 15 the other limb of which is slidably received in a bore 16' formed in the member 11. Both limbs of the support 15 carry calibrations. By means of its mounting arrangement, the weight 13 is movable parallel to the straight portion 14 of the arm 1 and also transversely thereto; the movement parallel to the arm 1 provides for fine control of the setting of the main balance weight 12 and the movement transverse to the arm 1 provides for lateral balancing of the arm 1, i.e., the balancing which is necessary to correct for the imbalance which the bent configuration of the arm would otherwise effect at the knife-edge mounting of the arm.

A bias compensation weight 16, the purpose and function of which is well known, is suspended by means of a line 17 which is secured to a post 18 extending from the yoke head piece 5 as shown and which passes over a pulley 19 fixed to the end of a cantilever 20.

DESCRIPTION OF INVENTIVE EMBODIMENT

Figure 2:
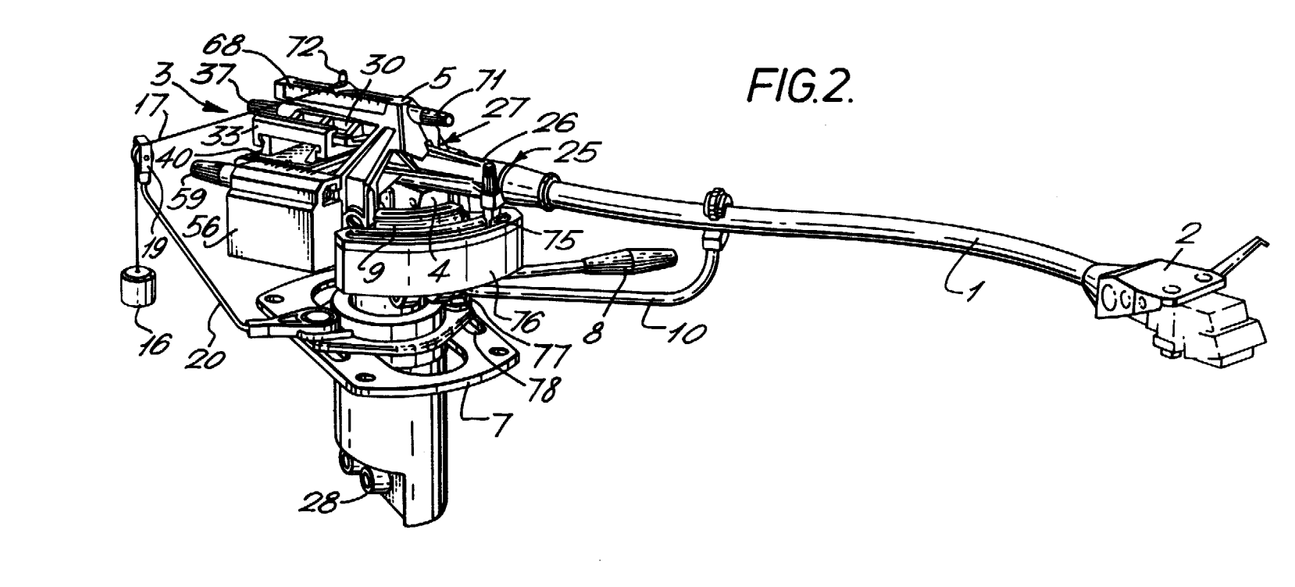
FIG. 2 is a perspective view of a pick-up arm according to the present invention.

Referring now to FIG. 2 which is a perspective view of an exemplary pick-up arm according to the invention, it will be seen immediately that many of the constructional details of the pick-up arm of FIG. 2 are the same as or closely similar to corresponding details of the prior art pick-up arm of FIG. 1. In particular, the mounting of the arm in the embodiment of FIG. 2 by means of knife-edge bearings co-operating with V-shaped grooves formed in a yoke mounted atop an axially rotatable pillar, the mounting of the pillar relative to a base plate, and the fixing of the arm raising and lowering mechanism, of the arm rest, and of the pulley support cantilever for the bias compensation weight, all are the same as or very similar to the corresponding details in the prior art arm of FIG. 1. For the sake of brevity, such details will be described hereinafter only in so far as they differ from the known details of the prior art arm described above. Features common to the arms of FIGS. 1 and 2 are designated with the same reference numerals in the two Figures.

The principal differences between the pick-up arm of FIG. 2 and the prior art arm of FIG. 1 reside in the construction and organization of the balance weight arrangement and these differences will now be described.

Figure 3:
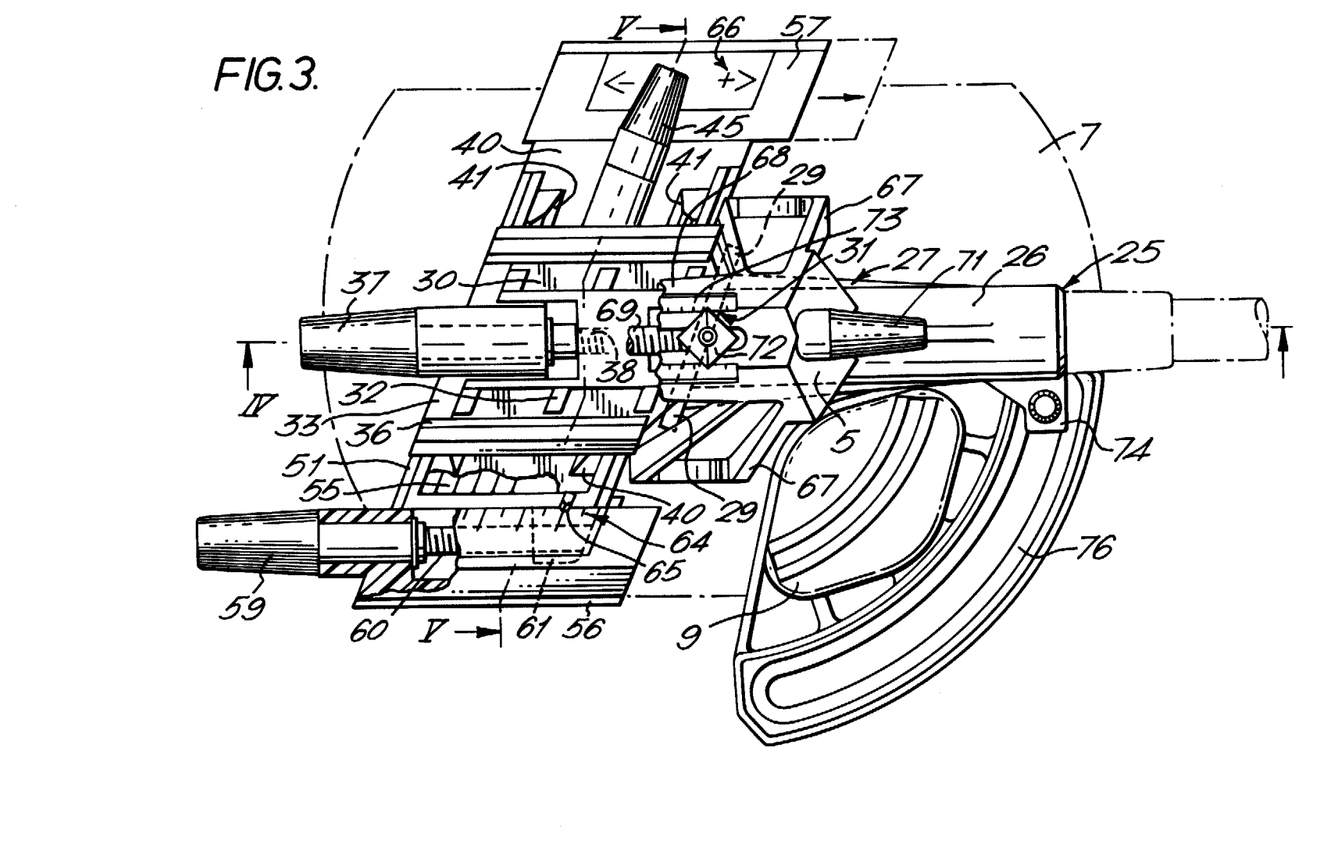
FIG. 3 is a plan view showing the balance weight arrangement in the pick-up arm of FIG. 2.

As shown in FIGS. 2 and 3 particularly, the arm proper 1 is constructed to plug into a receiving socket 25 formed in a nose portion 26 of a molded plastic bearing carrier 27. The socket 25 is provided with female electrical terminal parts adapted to receive corresponding male electrical terminal parts formed on the end of the arm 1 for the purpose of making electrical connection between conductors running from the headshell 2 and conductors running to the socket terminations shown at 28.

Figures 4, 5:
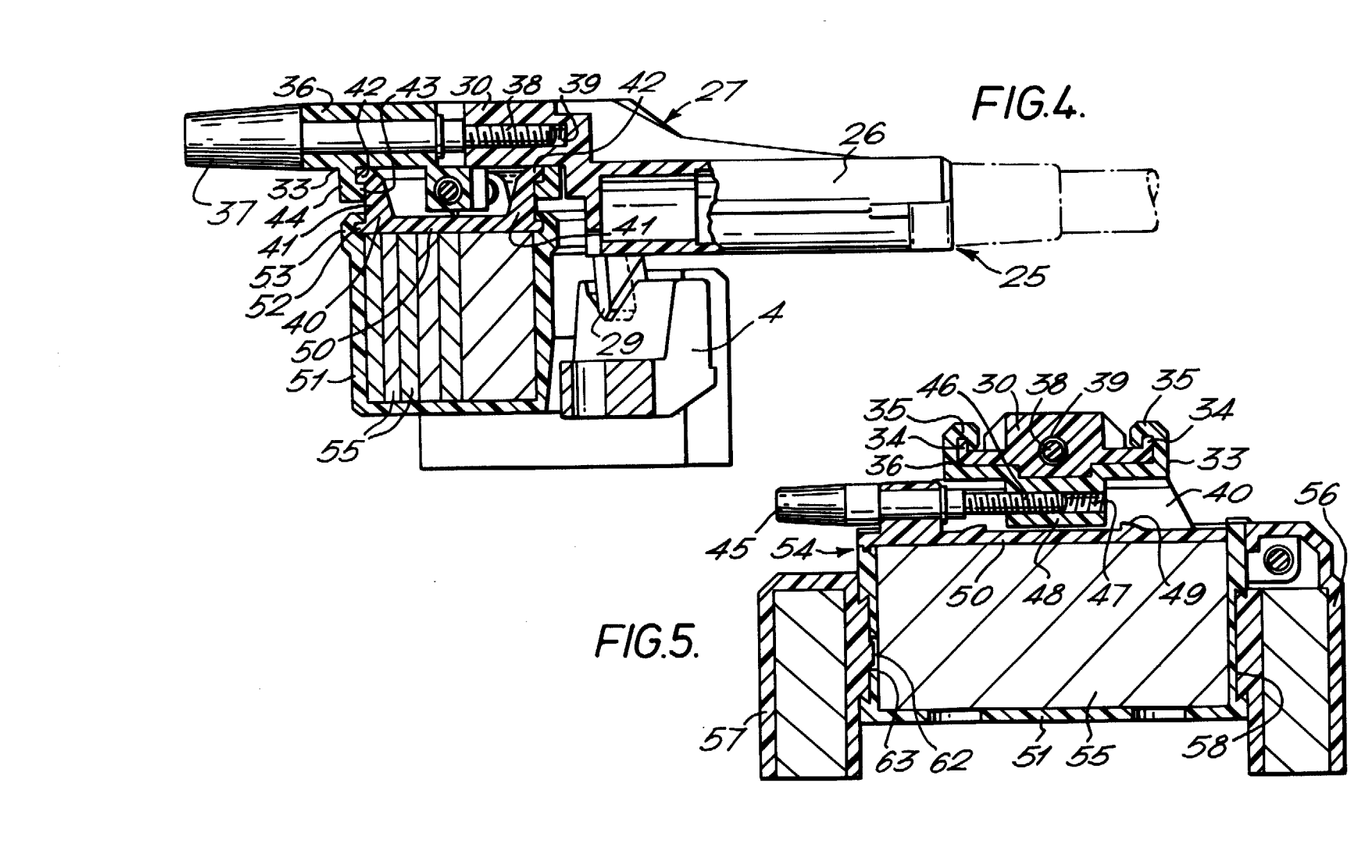
FIG. 4 is a sectional elevation view along line IV—IV in FIG. 3.
FIG. 5 is a further sectional elevation view along line V—V in FIG. 3.

The bearing carrier 27 can be seen in plan view in FIG. 3 and in cross-sectional views in FIGS. 4 and 5, in addition to the perspective, partially-obscured view in FIG. 2. This component is vital to the balance weight arrangement in the pick-up arm according to the invention in that, in a single integrally molded plastic material article, it provides by means of nose portion 26 the above mentioned plug-in facility for the arm proper, it furthermore incorporates the knife-edge bearing 29 which co-operates with the V-grooves in the supporting yoke 4, and it is formed furthermore with a portion 30 which extends rearwardly (opposite to the above mentioned nose portion) and provides (as hereinafter described) for the support of the balance weight arrangement in adjustable relationship relative to the arm support bearings.

It is to be noted that the arm proper 1 is generally S-shaped, in contrast to the shape of the arm proper in the prior art arrangement shown in FIG. 1. Whereas in the latter the arm support bearings, i.e., the knife-edge bearings and the co-operating V-grooves in the supporting yoke, provide for pivotal movement of the arm about an axis which is perpendicular to the longitudinal axis of the straight portion 14 of the arm, in the pick-up arm according to FIG. 2 the line of the knife-edge bearings and their co-operating V-grooves is inclined to the longitudinal axis of the adjacent portion of the arm; this is illustrated in FIG. 3 wherein the positions of the knife-edge bearings and the V-grooves are designated by the lines 31. This inclination of the arm bearings is selected according to the curved shape of the arm proper 1 so as to assure that vertical movements of the headshell 2 (and of a cartridge mounted therein) are effected by pivotal movement of the arm about an axis which is perpendicular to the longitudinal center line of the headshell, so that such vertical movements of the headshell as occur in use of the pick-up arm do not involve any rotational components of motion such as would give rise to changes in the attitude presented to a record groove by a stylus tracking in the groove. It will be appreciated that in the prior art arrangement of FIG. 1, the headshell center line is not perpendicular to the pivotal axis of the arm.

Referring more particularly to the constructional form of the bearing carrier 27 (best shown in the plan view of FIG. 3 and the sectional elevation view of FIG. 4), the nose portion 26 and the knife-edge bearings 29 and the rearwardly extending portion 30 can be clearly seen. The molding constituting bearing carrier 27 is a high precision molding of complex shape and includes numerous strengthening ribs 32 which provide rigidity to the structure without unduly increasing its weight. As shown most clearly in the cross-sectional view of FIG. 4, the nose portion 26 projects forwardly from a downwardly extending portion defining the knife-edge bearings 29, and the portion 30 extends rearwardly from the downwardly extending portion. As shown in FIGS. 3 and 4, the rearwardly extending portion has a generally flat lower surface configuration and is adapted to slidably engage a member 33 from which the balance weights are suspended and which provides for adjustment of the balance weights in the direction of line IV—IV in FIG. 3.

More particularly, and as shown in the sectional view of FIG. 5, the portion 30 has upstanding ribbed edges 34 adapted for engagement in sliding relationship with turned over upper edge portions 35 of a longitudinal slide member 36 (the member 33 above mentioned). The portion 30 of bearing carrier 27 and the slide member 36 thus engage with one another for sliding movement in the direction of the line IV—IV in FIG. 3. This movement is enabled by means of a micrometer adjustment facility comprising a small knob 37 which is fastened to one end of a lead screw 38 which is itself held captive on the slide member 36. The other end of the lead screw 38 engages in a screw-threaded bore 39 formed in the portion 30 of the bearing carrier 27. As will be appreciated, rotation of the knob 37 to turn the lead screw 38 will cause the slide member 36 to move relatively to the portion 30 of the bearing carrier 27 along the line IV—IV in FIG. 3, the direction of relative movement being dependent upon the direction of rotation of the knob 37.

The slide member 36 carries the balance weights proper (described hereinafter) but, as with the relationship between the bearing carrier 27 and the slide member 36, so also is the relationship between the slide member 36 and the balance weights proper a sliding relationship. A lateral slide member 40 (see in particular FIGS. 3, 4 and 5) has upstanding ribs 41 provided with outwardly turned edge portions 42 which engage in sliding relationship with inwardly turned edge portions 43 of the downwardly depending ribs 44 formed on the lower surface of slide member 36. By virtue of this arrangement, the lateral slide member 40 is made capable of sliding movement relative to the slide member 36 in a direction parallel to the axis of the knife-edge bearings about which the arm pivots. For effecting this movement, and as shown most clearly in FIG. 5, a small knob 45 is attached to one end of a lead screw 46 held captive to the lateral slide member 40, the other end of the lead screw 46 engaging with a screw-threaded bore 47 provided in an integrally-formed block 48 depending from the lower surface of slide member 36. By rotation of the knob 45 so as to rotate the lead screw 46, the lateral slide member 40 can be translated laterally relative to the slide member 36, the direction of translation of the lateral slide member 40 relative to the slide member 36 being dependent upon the direction of rotation of the knob 45. Stops 49 limit the extent of relative movement between the slide members 36 and 40.

The base portion 50 of lateral slide member 40 (see FIGS. 4 and 5) constitutes a top closure for a main balance weight casing 51 which is formed as an open topped box shaped as a parallelepiped as shown. The top closure 50 of the box 51 has edge portions 52 which engage with grooves 53 formed in the upper faces of the major walls of the box (as shown in FIG. 4) so that the closure 50 makes sliding engagement with the box 51. A locking catch on the underside of one edge of the closure 50 is adapted to engage a complementarily shaped recess in the top edge of one of the minor walls of the box (as shown in FIG. 5 at 54) for holding the closure 50 in closed position relative to the top of the box. The box 51 serves to contain one or more lead weights 55, together with one or more light-weight plastic spacers as appropriate to fill the box and retain the weights against movement within the box. The weights contained in the box constitute the main balance counterweight of the arm, and the number of weights and their mass will be determined by the particular cartridge used with the arm and the mass of that cartridge. As will be appreciated, the provision of a main balancing counterweight in the form of a box into which an appropriate mass of weights can be inserted enables cartridges of different masses to be balanced by means of a balance weight having its center of gravity located always at a substantially constant distance from the arm bearings; only the mass of the balance weight changes to accommodate cartridges of different masses.

The main balance weight casing 51 carries a pair of rider weights each mounted on a minor side wall of the box 51. A fine adjustment rider weight 56 is mounted on the right hand side of the main balance weight casing 51 as viewed in FIG. 5 and a coarse adjustment rider weight 57 is mounted on the left hand side of the main balance weight casing 51. The fine adjustment rider weight 56 is contained in a molded plastic casing which is secured to the main balance weight casing 51 by means of a dovetail connection 58 such as to permit relative movement between the casing 51 and the weight 56. This movement is enabled by means of a knob 59 connected to a lead screw 60 captive to the rider weight casing 56 and arranged for engagement with a screw-threaded bore formed in a portion 61 projecting from the side wall of main balance weight casing 51. Upon rotation of the knob 59, the fine adjustment rider weight 56 will move relatively to main balance weight casing 51, the movement being parallel to the line IV—IV shown in FIG. 3 and in a direction dependent upon the direction of rotation of the knob 59. The coarse adjustment rider weight 57 is similar to the fine adjustment rider weight and is similarly attached to the side wall of the main balance weight casing 51, but has no micrometer adjustment facility such as is provided for the fine adjustment rider weight; rather, the coarse adjustment rider weight 57 is movable manually between two positions as indicated in FIG. 3, an abutment 62 formed on the casing of the coarse adjustment rider weight 57 co-operating with a slot 63 in the wall of the main balance weight casing 51 to define the two limiting positions of the coarse adjustment rider weight 57. A graduated scale 64 on the fine adjustment rider weight 56 co-operates with a pointer 65 carried on the lateral slide member 40, and indicia 66 are provided on the coarse adjustment rider weight 57.

From the foregoing, it will be seen that the balance weight arrangement comprises a main balance weight flanked by two rider weights, one providing fine weight adjustment and the other providing coarse adjustment. The arrangement thus comprised is movable bodily in a longitudinal direction relative to the back end of the arm proper (i.e., in the direction of line IV—IV in FIG. 3), and also is movable bodily in a transverse direction parallel to the line of the knife-edge bearings upon which the arm is supported. The purpose of the described adjustment facilities will doubtless be clear to those skilled in this art without explanation, but some brief comments in this regard will nevertheless be made.

The prior art pick-up arm of FIG. 1 included a yoke head piece 5 the function of which was to capture the arm in its pivotal bearings. A similar member is provided in the pick-up arm according to the invention and is also designated 5 in FIGS. 2 and 3. This member 5 is formed of molded plastic material and has two legs 67 which straddle the bearing carrier 27 without touching it, and are secured at their lower ends to the sides of the bearing yoke 4. As shown most clearly in FIG. 2, the member 5 has a rearwardly extending portion 68 which overlies, but does not touch, the portion 30 of the bearing carrier 27 and contains a captive lead screw 69 (see FIG. 3) arranged to be turned by means of knob 71 in order to move an anchor point 72 for the support filament 17 of the bias compensation weight 16. A scale 73 extends along the portion 68.

Shown at 74 in FIG. 3 is an attachment point formed on the front end of the nose portion 26 of the bearing carrier 27 for a paddle 75 (see FIG. 2) which extends downwardly into a trough 76 for containing silicone fluid or the like. This arrangement serves to provide damping of any tendency which might occur for the arm to move other than in a normal manner across a record. The damping will not resist the normal movement of the arm across a record, but any influence which would tend to produce over-rapid arm motion is resisted because of the flow characteristics of the damping fluid.

The arm proper 1 preferably is formed of a thin walled titanium tube processed in an atmosphere of nitrogen so as to generate an all enveloping surface layer of titanium nitride which is very hard. Such an arm has advantageous low resonance properties.

The arm is set up for playing by initially setting the coarse adjustment rider weight 57 into its most rearward position (i.e., the position shown in FIG. 3) and setting the fine adjustment rider weight to a "zero" position (again corresponding to the position shown in FIG. 3). Then, by means of the knob 37, the arm can be longitudinally balanced. Next, by means of knob 59 and in conjunction with scale 64, the system can be unbalanced to the extent required to produce the desired tracking force; if a substantial tracking force is required, the coarse adjustment rider weight may be employed in addition to the fine adjustment rider weight. The anchor point of the bias compensation weight support thread may then be adjusted, and finally the lateral balance of the arm can be adjusted by means of the knob 45, this being effected with the headshell supported and by lifting the back end of the arm by means of a thread looped around the projection in the end of knob 37 (see FIG. 3) and observing the lateral balance by observing the positions relative to horizontal of the two rider weights. An adjustment of the orientation of the arm relative to the base plate 7 can be effected by rotation of the capstan 77 which drives a small gear engaged with a rack formed in an edge of the slot 78.

The pick-up arm described with reference to FIGS. 2 to 5 of the accompanying drawings is the SME Series III precision pick-up arm which is available from its manufacturers SME Limited of Steyning, Sussex, BN4 3GY, England.

Various alternations and modifications could be made to the arm described above with reference to FIGS. 2 to 5 without departure from the scope of the present invention as defined by the appended claims. For example, a simplified version of the arm is contemplated in which the lateral adjustment facility for the balance weight arrangement (that is the adjustment effected by the knob 45) is omitted, the fine adjustment rider weight 56 has no micrometer adjustment facility and is adapted simply to be set manually by sliding it relative to the main balance weight into the requisite position, and the various weights 55 which constitute the main balance weight (and which in the embodiment just described are contained in the box 51) are simply slung below the rear portion 30 of the bearing carrier 27 in a carrier which is similar to the member 33 in regard to providing for longitudinal adjustment of the balance weight, but otherwise simply provides for as many weights 55 as are required to be engaged with the carrier (complementarily shaped formations being provided on the weights and on the carrier for enabling the weights to be slidably engaged with the carrier) and to be locked in place by means of an adjustable clamp. The carrier might, for example, have spaced rails with which grooves formed in the edges of the weights can engage for engaging the weights with the carrier, and the clamp might simply comprise a member likewise engageable with the said rails and provided with a locking screw adapted to bear against the weights so as to cause them and the clamping member to bind with the rails and thereby be locked in position.

What I claim is:

1. A gramophone pick-up arm comprising
(a) an arm proper;

(b) a headshell attached to one end of said arm for carrying a pick-up cartridge;

(c) a bearing arrangement associated with said arm for providing for rotation of said arm about a vertical axis and for pivotal movement of said arm about a horizontal axis;

(d) a balance weight arrangement associated with the other end of said arm, said balance weight arrangement comprising a main balance weight component constituted by a balance weight carrier together with individual balance weight elements carried by said carrier, said elements being selected inter alia according to the mass of the cartridge carried by said headshell, and a subsidiary balance weight component constituted by a pair of rider weights flanking said balance weight carrier, one of said rider weights being coupled to said balance weight carrier by means of a micrometer screw adjustment means, whereby its position relative to said balance weight carrier can be precisely set, and the other rider weight being coupled to said balance weight carrier by indexable means enabling the said other rider weight to be set to first and second predetermined positions relative to said main balance weight carrier; and (e) adjustable mounting means adjustably coupling said balance weight carrier to the said other end of said arm, whereby the position of said balance weight arrangement relative to the bearing arrangement can be varied.

2. A pick-up arm according to claim 1, wherein said adjustable mounting means comprises a first means mounting the balance weight carrier to be adjustable in a first, generally longitudinal direction substantially parallel to the axis of the arm at the location of the bearing arrangement, and second independently adjustable means mounting said balance weight carrier to be adjustable in a second, generally transverse direction substantially parallel to the horizontal pivotal axis of the arm.

3. A pick-up arm as claimed in claim 2, wherein micrometer screw adjustment facilities are provided for enabling precision adjustment of the balance weight carrier in either of said first and second directions.

4. A pick-up arm as claimed in claim 2, wherein the said first and second directions are not perpendicular to each other, the arm proper being bent and the horizontal pivotal axis of the arm being non-perpendicular to the arm at the location of the bearing arrangement but rather being substantially perpendicular to the center-line of the headshell.

5. A pick-up arm as claimed in claim 4, wherein the balance weight carrier is in the form of a parallelepipedal box having minor side walls parallel to said first direction and major side walls parallel to said second direction.

6. A pick-up arm as claimed in claim 5, wherein the individual balance weight elements comprise parallelepipedal laminations adapted to fit into said box parallel to the major side walls thereof.

7. A pick-up arm as claimed in any one of claims 1-6 wherein the arm proper is received as a plug-in unit in a socket formed in a forwardly-extending nose portion of a bearing carrier which further comprises knife-edge bearing elements for co-operation with horizontal V-grooves formed in a vertically rotatable yoke, the V-grooves and knife-edge bearing elements defining the horizontal pivotal axis of the arm, and a rearwardly-extending portion which provides a support facility for the balance weight arrangement.

8. A pick-up arm as claimed in claim 7, wherein the rearwardly-extending portion of the bearing carrier slidably engages a first member for movement therebetween in a first direction, and said first member in turn slidably engages a second member for movement therebetween in a second direction, one of said directions being generally longitudinal with respect to the arm and the other being generally transverse with respect to the arm, and the balance weight carrier is supported by means of said second member.

9. A pick-up arm as claimed in claim 8, wherein said bearing carrier, said first and second members, and said balance weight carrier are all formed of precision molded synthetic plastic material.

10. A pick-up arm as claimed in claim 7, wherein said arm proper is a titanium tube having a titanium nitride surface layer.

11. A pick-up arm as claimed in claim 7 wherein a paddle attached to the arm proper co-operates with a tank filled with damping fluid for damping movements of the arm about said vertical axis.

12. A pick-up arm as claimed in claim 7 including a mounting plate for attachment to the deck of a gramophone, and a base plate adjustably attached to said mounting plate and serving as a principal support for the arm, a rotatable capstan being provided on said base plate and being coupled to a gear engaged with a rack formed in said mounting plate such that upon rotation of said capstan the orientation of the base plate relative to the mounting plate can be adjusted.

13. A gramophone pick-up arm comprising
(a) a non-rectilinear arm proper;
(b) a headshell carried by one end of said arm for supporting a pick-up cartridge;
(c) a bearing arrangement associated with said arm and comprising a member rotatable about a vertical axis and having associated therewith means permitting pivotal movement of said arm about an horizontal axis generally perpendicular to the center line of said headshell; and
(d) a balance weight arrangement associated with the other end of said arm; said balance weight arrangement comprising a main balance weight carrier mounted by a first mounting means permitting adjustment of said main balance weight carrier relative to said bearing arrangement in a first direction generally parallel with the axis of said arm at the location of said bearing arrangement and by a second mounting means permitting adjustment of said main balance weight carrier independently relative to said bearing arrangement in a second direction generally parallel to the horizontal pivotal axis of said arm, individual balance weight elements carried by said carrier, the number of said elements being selected in accordance with the mass to be balanced and the desired tracking force, and a pair of rider weights mounted one on either side of said carrier with respect to said first direction by mounting means enabling adjustment of said rider weights relative to said carrier in said first direction.

14. A gramophone pick-up arm comprising
(a) a generally S-shaped arm proper;
(b) a headshell carried at one end of said arm for supporting a pick-up cartridge;

(c) a member rotatable about a vertical axis and having formed therein V-grooves for constituting part of a knife-edge bearing for enabling said arm to pivot about an horizontal axis;

(d) a bearing carrier comprising knife-edge bearings located in said V-grooves, said arm proper being secured to said bearing carrier and said knife-edge bearing being oriented such that the center line of said headshell is substantially perpendicular to said horizontal axis; and (e) a balance weight arrangement comprising a main balance weight carrier adjustably secured to said bearing carrier rearwardly of said knife-edge bearings relative to the cartridge-supporting end of said arm proper, said carrier comprising a parallelepipedal box having major side walls parallel to said horizontal axis and minor side walls generally parallel to the axis of said arm proper at the location of said vertical and horizontal arm bearings, the means adjustably securing said main balance weight carrier to said bearing carrier enabling the position of said box to be adjusted relative to said location in a first direction parallel to said axis of said arm proper and independently in a second direction parallel to said horizontal axis, said first and second directions being non-perpendicular, parallelepipedal laminations comprising elemental balance weights being provided in said box in appropriate numbers for balancing the arm and providing an appropriate tracking force, and first and second rider weights adjustably secured to and flanking said box, the adjustable securing means of said rider weights enabling the positions of said rider weights relative to said box to be adjusted in said first direction, the securing means associated with one of said rider weights providing for fine control of the adjustment thereof relative to said box and the securing means associated with the other of said rider weights providing for idexing movement of the respective rider weight relative to said box selectively between first and second predetermined locations.

15. A gramophone pick-up arm comprising (a) an arm proper;

(b) a headshell attached to one end of said arm for carrying a pick-up cartridge;

(c) a bearing arrangement associated with said arm for providing for rotation of said arm about a vertical axis and for pivotal movement of said arm about a horizontal axis;

(d) a balance weight arrangement associated with the other end of said arm, said balance weight arrangement comprising a main balance weight component constituted by a balance weight carrier together with individual balance weight elements carried by said carrier, said elements being selected inter alia according to the mass of the cartridge carried by said headshell, and a subsidiary balance weight component constituted by a pair of rider weights flanking said balance weight carrier, said balance weight carrier being coupled to the said other end of said arm by means including a micrometer screw adjustment means enabling precision adjustment of said balance weight carrier in a longitudinal direction generally parallel to the axis of said arm at the location of said bearing arrangement, said rider weights being coupled to said balance weight carrier by means providing an adjustment facility, whereby their positions relative to the balance weight carrier can be adjusted in said longitudinal direction, and the arm proper being curved such that the center line of said headshell is neither parallel to nor colinear with the axis of said arm at the location of said bearing arrangement and the horizontal pivotal axis of the arm being non-perpendicular to said arm at the location of said bearing arrangement but rather being substantially perpendicular to said center line of said headshell.

16. A pick-up arm as claimed in claim 15, wherein said individual balance weight elements comprise generally planar laminations carried by said carrier with their principal planes parallel to the horizontal pivotal axis of said arm.

17. A pick-up arm as claimed in claim 15 or 16, wherein said arm proper is received as a plug-in unit in a socket formed in a forwardly-extending nose portion of a bearing carrier which further comprises knife-edge bearing elements for co-operation with horizontal V-grooves formed in a vertically rotatable yoke, said V-grooves and knife-edge bearing elements defining the horizontal pivotal axis of said arm, said bearing carrier further comprising a rear wardly-extending portion which slidably engages a support member for said balance weight carrier, said rearwardly-extending portion of said bearing carrier slidably engaging said balance weight carrier support member through the intermediary of said micrometer screw adjustment means.

18. A pick-up arm as claimed in claim 17, wherein said bearing carrier and said balance weight carrier are formed of precision molded synthetic plastic material.

19. A pick-up arm as claimed in claim 15 or 16, wherein the arm proper is a titanium tube having a titanium nitride surface layer.

20. A pick-up arm as claimed in claim 15 or 16, wherein a paddle attached to the arm proper co-operates with a tank filled with damping fluid for damping movements of the arm about said vertical axis.

21. A pick-up arm as claimed in claim 15 or 16, including a mounting plate for attachment to the deck of a gramophone, and a base plate adjustably attached to said mounting plate and serving as a principal support for the arm, a rotatable capstan being provided on said base plate and being coupled to a gear engaged with a rack formed in said mounting plate such that upon rotation of said capstan the orientation of the base plate relative to the mounting plate can be adjusted.

* * * * *